(12) United States Patent
O'Connor et al.

(10) Patent No.: US 11,085,636 B2
(45) Date of Patent: Aug. 10, 2021

(54) FUEL OXYGEN CONVERSION UNIT

(71) Applicant: General Electric Company, Schenectady, NY (US)

(72) Inventors: Ethan Patrick O'Connor, Hamilton, OH (US); Daniel Alan Niergarth, Norwood, OH (US); Brandon Wayne Miller, Liberty Township, OH (US); Richard Alan Wesling, Cincinnati, OH (US); Peter Allen Andrews, Jr., Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 139 days.

(21) Appl. No.: 16/179,022

(22) Filed: Nov. 2, 2018

(65) Prior Publication Data

US 2020/0141574 A1 May 7, 2020

(51) Int. Cl.
*F23K 5/08* (2006.01)
*B01D 19/00* (2006.01)
(Continued)

(52) U.S. Cl.
CPC ............ *F23K 5/08* (2013.01); *B01D 19/0005* (2013.01); *B64D 37/34* (2013.01); *F02C 7/224* (2013.01);
(Continued)

(58) Field of Classification Search
CPC .. B01D 3/343; B01D 45/14; B01D 2257/104; B01D 19/0005; B01D 19/0063;
(Continued)

(56) References Cited

U.S. PATENT DOCUMENTS 2,582,842 A 1/1952 Messinger
2,720,313 A 10/1955 Pattison
(Continued)

FOREIGN PATENT DOCUMENTS

EP 2003311 A2 12/2008
EP 3018304 A1 5/2016
(Continued)

OTHER PUBLICATIONS

U.S. Appl. No. 15/819,327, filed Nov. 28, 2017.
(Continued)

*Primary Examiner* — Scott J Walthour
(74) *Attorney, Agent, or Firm* — Dority & Manning, P.A.

(57) ABSTRACT

A fuel oxygen conversion unit includes a stripping gas flowpath for a vehicle or an engine of the vehicle. The fuel oxygen conversion unit includes a stripping gas boost pump positioned in airflow communication with the stripping gas flowpath for increasing a pressure of a flow of stripping gas through the stripping gas flowpath; a contactor defining a stripping gas inlet in airflow communication with the stripping gas flowpath, a liquid fuel inlet, and a fuel/gas mixture outlet; a fuel gas separator defining a fuel/gas mixture inlet in fluid communication with the fuel/gas mixture outlet of the contactor, a stripping gas outlet, and a liquid fuel outlet; and a connection assembly mechanically coupling the stripping gas boost pump to the fuel gas separator, the connection assembly having a speed change mechanism such that the stripping gas boost pump rotates at a different rotational speed than the fuel gas separator.

16 Claims, 7 Drawing Sheets

(51) Int. Cl.
*F02C 7/224* (2006.01)
*F23K 5/04* (2006.01)
*B64D 37/34* (2006.01)
*F23K 5/14* (2006.01)

(52) U.S. Cl.
CPC .............. *F23K 5/04* (2013.01); *F23K 5/142* (2013.01); *F05D 2260/213* (2013.01); *F05D 2260/53* (2013.01); *F23K 2300/10* (2020.05)

(58) Field of Classification Search
CPC ... B64D 37/34; F01M 2013/0422; F02C 3/20; F02C 7/22; F02C 7/222; F02C 7/224; F02C 7/236; F02C 7/32; F02M 37/22; F04D 31/00; F05D 2260/213; F05D 2260/53; F23K 5/04; F23K 5/08; F23K 5/10; F23K 5/142; F23K 5/18; F23K 2300/10; F23K 2300/103; F23K 2300/204; F23K 2900/00004; F23K 2900/05082
See application file for complete search history.

(56) References Cited

U.S. PATENT DOCUMENTS

| | | |
|---|---|---|
| 2,893,628 A | 7/1959 | Herman |
| 3,050,240 A | 8/1962 | Darnell |
| 3,178,105 A | 4/1965 | Darnell |
| 3,590,559 A | 7/1971 | Bragg |
| 3,847,298 A | 11/1974 | Hamilton |
| 3,895,243 A | 7/1975 | Amend et al. |
| 3,902,658 A | 9/1975 | Madsen |
| 4,169,567 A | 10/1979 | Tamura |
| 4,170,116 A | 10/1979 | Williams |
| 4,449,372 A | 5/1984 | Rilett |
| 4,503,682 A | 3/1985 | Rosenblatt |
| 4,505,124 A | 3/1985 | Mayer |
| 4,550,573 A | 11/1985 | Rannenberg |
| 4,600,413 A | 7/1986 | Sugden |
| 4,714,139 A | 12/1987 | Lorenz et al. |
| 4,738,779 A | 4/1988 | Carroll et al. |
| 4,755,197 A | 7/1988 | Benson et al. |
| 4,773,212 A | 9/1988 | Griffin et al. |
| 5,149,018 A | 9/1992 | Clark |
| 5,267,608 A | 12/1993 | Coffinberry |
| 5,341,636 A | 8/1994 | Paul |
| 5,452,573 A | 9/1995 | Glickstein et al. |
| 5,587,068 A | 12/1996 | Aho, Jr. et al. |
| 5,622,621 A | 4/1997 | Kramer |
| 5,667,168 A | 9/1997 | Fluegel |
| 5,722,241 A | 3/1998 | Huber |
| 5,724,806 A | 3/1998 | Homer |
| 5,904,836 A | 5/1999 | Lee et al. |
| 6,134,876 A | 10/2000 | Hines et al. |
| 6,182,435 B1 | 2/2001 | Niggemann et al. |
| 6,250,097 B1 | 6/2001 | Lui et al. |
| 6,294,091 B1 | 9/2001 | Hoff |
| 6,415,595 B1 | 7/2002 | Wilmot, Jr. et al. |
| 6,435,454 B1 | 8/2002 | Engelhardt |
| 6,701,717 B2 | 3/2004 | Flatman et al. |
| 6,702,729 B2 | 3/2004 | Mazzuca |
| 6,892,710 B2 | 5/2005 | Ekstam |
| 6,939,392 B2 | 9/2005 | Huang et al. |
| 7,093,437 B2 | 8/2006 | Spadaccini et al. |
| 7,260,926 B2 | 8/2007 | Sabatino et al. |
| 7,334,407 B2 | 2/2008 | Spadaccini et al. |
| 7,377,098 B2 | 5/2008 | Walker et al. |
| 7,387,602 B1 | 6/2008 | Kirsch |
| 7,398,641 B2 | 7/2008 | Stretton et al. |
| 7,431,818 B2 | 10/2008 | Cipollini |
| 7,459,081 B2 | 12/2008 | Koenig et al. |
| 7,536,851 B2 | 5/2009 | McLain |
| 7,569,099 B2 | 8/2009 | Coffin et al. |
| 7,628,965 B2 | 12/2009 | Johnson et al. |
| 7,694,916 B2 | 4/2010 | Limaye et al. |
| 7,735,670 B2 | 6/2010 | Zaki et al. |
| 7,744,827 B2 | 6/2010 | Vanderspurt et al. |
| 7,824,470 B2 | 11/2010 | Chiappetta et al. |
| 7,836,680 B2 | 11/2010 | Schwarz et al. |
| 7,882,704 B2 | 2/2011 | Chen |
| 7,896,292 B2 | 3/2011 | Limaye et al. |
| 7,905,259 B2 | 3/2011 | Johnson et al. |
| 7,966,807 B2 | 6/2011 | Norris et al. |
| 7,987,676 B2 | 8/2011 | Ast et al. |
| 8,055,437 B2 | 11/2011 | Proietty et al. |
| 8,141,360 B1 | 3/2012 | Huber |
| 8,177,884 B2 | 5/2012 | Schmidt et al. |
| 8,231,714 B2 | 7/2012 | Cornet et al. |
| 8,261,528 B2 | 9/2012 | Chillar et al. |
| 8,388,830 B2 | 3/2013 | Sohn et al. |
| 8,450,020 B2 | 5/2013 | Sinha et al. |
| 8,499,567 B2 | 8/2013 | Hagh et al. |
| 8,499,822 B2 | 8/2013 | Bulin et al. |
| 8,522,572 B2 | 9/2013 | Coffinbeny et al. |
| 8,602,362 B2 | 12/2013 | Buchwald |
| 8,663,996 B2 | 3/2014 | Beeson |
| 8,765,070 B2 | 7/2014 | Norton et al. |
| 8,789,377 B1 | 7/2014 | Brostmeyer |
| 8,821,362 B2 | 9/2014 | Kidd et al. |
| 8,828,344 B2 | 9/2014 | K-WLam et al. |
| 8,858,161 B1 | 10/2014 | Ryznic et al. |
| 8,944,367 B2 | 2/2015 | Bystry, Jr. et al. |
| 8,978,353 B2 | 3/2015 | Norton et al. |
| 8,984,884 B2 | 3/2015 | Xu et al. |
| 9,014,791 B2 | 4/2015 | Held |
| 9,038,397 B2 | 5/2015 | Papa et al. |
| 9,120,580 B2 | 9/2015 | Sampath |
| 9,144,768 B2 | 9/2015 | Tichborne et al. |
| 9,162,162 B2 | 10/2015 | Yount |
| 9,231,267 B2 | 1/2016 | McAlister |
| 9,435,246 B2 | 9/2016 | Devarakonda |
| 9,567,095 B2 | 2/2017 | McCarthy et al. |
| 9,580,185 B2 | 2/2017 | Rhoden et al. |
| 9,656,187 B2 | 5/2017 | Lo et al. |
| 9,687,773 B2 | 6/2017 | Johnson et al. |
| 9,724,625 B2 | 8/2017 | Lo |
| 9,752,507 B2 | 9/2017 | Selstad et al. |
| 9,771,867 B2 | 9/2017 | Karam et al. |
| 9,834,315 B2 | 12/2017 | Lo et al. |
| 9,863,322 B2 | 1/2018 | Williams |
| 9,885,290 B2 | 2/2018 | Della-Fera et al. |
| 9,897,054 B2 | 2/2018 | Lo et al. |
| 2009/0133380 A1 | 5/2009 | Donnerhack |
| 2009/0158739 A1 | 6/2009 | Messmer |
| 2009/0188234 A1 | 7/2009 | Suciu et al. |
| 2010/0212857 A1 | 8/2010 | Bulin et al. |
| 2010/0313591 A1 | 12/2010 | Lents et al. |
| 2011/0262309 A1 | 10/2011 | Limaye et al. |
| 2012/0216502 A1 | 8/2012 | Freund et al. |
| 2012/0216677 A1 | 8/2012 | Koenig et al. |
| 2013/0186100 A1 | 7/2013 | Rhoden et al. |
| 2014/0165570 A1 | 6/2014 | Herring |
| 2014/0205446 A1 | 7/2014 | Patsouris et al. |
| 2014/0345292 A1 | 11/2014 | Diaz et al. |
| 2014/0360153 A1 | 12/2014 | Papa et al. |
| 2015/0000291 A1 | 1/2015 | Smith et al. |
| 2015/0040986 A1 | 2/2015 | Tichborne et al. |
| 2015/0072850 A1 | 3/2015 | Derrick et al. |
| 2015/0159867 A1 | 6/2015 | Patrick et al. |
| 2016/0003160 A1 | 1/2016 | Hagshenas |
| 2016/0096629 A1 | 4/2016 | Vaisman |
| 2016/0108814 A1 | 4/2016 | Schmitz |
| 2016/0138431 A1 | 5/2016 | Lear, Jr. |
| 2016/0146108 A1* | 5/2016 | Yates .................... F02C 7/236 415/124.1 |
| 2016/0167802 A1 | 6/2016 | Lo et al. |
| 2016/0208759 A1 | 7/2016 | Lo et al. |
| 2016/0245144 A1 | 8/2016 | Selberg et al. |
| 2016/0290214 A1 | 10/2016 | Ekanayake et al. |
| 2016/0305440 A1 | 10/2016 | Laboda et al. |
| 2016/0369700 A1 | 12/2016 | Ribarov et al. |
| 2017/0030266 A1 | 2/2017 | Cerny et al. |
| 2017/0096910 A1 | 4/2017 | Raimarckers et al. |

(56) References Cited

U.S. PATENT DOCUMENTS

| | | |
|---|---|---|
| 2017/0113807 A1 | 4/2017 | Burnell et al. |
| 2017/0114721 A1 | 4/2017 | Miller et al. |
| 2017/0141419 A1 | 5/2017 | Wu et al. |
| 2017/0159566 A1 | 6/2017 | Sennoun et al. |
| 2017/0167382 A1 | 6/2017 | Miller et al. |
| 2017/0291714 A1 | 10/2017 | Corman |
| 2018/0016025 A1 | 1/2018 | Rheaume et al. |
| 2018/0056233 A1 | 3/2018 | Henson et al. |
| 2018/0056234 A1 | 3/2018 | Weng et al. |
| 2018/0071659 A1 | 3/2018 | Rhoden |
| 2018/0118367 A1 | 5/2018 | Rheaume et al. |
| 2020/0086239 A1 | 3/2020 | Cordatos et al. |

FOREIGN PATENT DOCUMENTS

| | | |
|---|---|---|
| EP | 3075957 A1 | 10/2016 |
| EP | 3623030 A1 | 3/2020 |
| GB | 2136880 A | 9/1984 |
| GB | 2204361 A | 11/1988 |
| JP | S5932893 U | 2/1984 |
| WO | WO 02/16743 A1 | 2/2002 |
| WO | WO2002/038938 A1 | 5/2002 |
| WO | WO2006/079438 A1 | 8/2006 |
| WO | WO2011/038188 A1 | 3/2011 |

OTHER PUBLICATIONS

U.S. Appl. No. 15/819,443, filed Nov. 21, 2017.
Landfill, Sewage, Biogas, Coal, Seam & Mines Gas Sepamtion/Filtration, Kelburn Engineering—LandfillGas and Air Separation, 3 pages. www.kelburneng.com.uk//landfill-gas-bio-gas-sewer-gas.php.

* cited by examiner

FUEL OXYGEN CONVERSION UNIT

FIELD

The present subject matter relates generally to a fuel oxygen conversion unit for an engine utilizing a stripping gas.

BACKGROUND

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain operations and systems of the gas turbine engines and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel.

However, heating the fuel up without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount. Fuel oxygen conversion systems have been proposed for such a purpose. Certain of these fuel oxygen conversion systems may mix a stripping gas with a liquid fuel to absorb oxygen from, or otherwise react with, the liquid fuel to reduce an oxygen content of the liquid fuel. However, effectively and efficiently providing for a flow of the stripping gas through the system, mixing the stripping gas with the liquid fuel, and subsequently separating the stripping gas from the liquid fuel, may be difficult to achieve. Accordingly, a fuel oxygen conversion unit with systems for efficiently circulating the stripping gas and subsequently removing the stripping gas from the liquid fuel would be useful.

BRIEF DESCRIPTION

Aspects and advantages of the invention will be set forth in part in the following description, or may be obvious from the description, or may be learned through practice of the invention.

In one exemplary embodiment of the present disclosure, a fuel oxygen conversion unit defining a stripping gas flowpath for a vehicle or an engine of the vehicle is provided. The fuel oxygen conversion unit includes a stripping gas boost pump positioned in airflow communication with the stripping gas flowpath for increasing a pressure of a flow of stripping gas through the stripping gas flowpath; a contactor defining a stripping gas inlet in airflow communication with the stripping gas flowpath, a liquid fuel inlet, and a fuel/gas mixture outlet; a fuel gas separator defining a fuel/gas mixture inlet in fluid communication with the fuel/gas mixture outlet of the contactor, a stripping gas outlet, and a liquid fuel outlet; and a connection assembly mechanically coupling the stripping gas boost pump to the fuel gas separator, the connection assembly having a speed change mechanism such that the stripping gas boost pump rotates at a different rotational speed than the fuel gas separator.

In certain exemplary embodiments the speed change mechanism is a gearbox.

For example, in certain exemplary embodiments the gearbox defines a gear ratio, wherein the gear ratio is greater than 1:1 such that the stripping gas boost pump rotates more quickly than the fuel gas separator.

For example, in certain exemplary embodiments the gearbox defines a gear ratio, wherein the gear ratio is less than 1:1 such that the fuel gas separator rotates more quickly than the stripping gas boost pump.

In certain exemplary embodiments the speed change mechanism is a continuously variable transmission.

In certain exemplary embodiments the speed change mechanism is a torque converter.

In certain exemplary embodiments the engine further includes an accessory gearbox, and wherein the fuel gas separator and stripping gas boost pump are each driven by the accessory gearbox.

For example, in certain exemplary embodiments the accessory gearbox includes a first pad, and wherein the fuel gas separator and the stripping gas boost pump are each driven by the first pad of the accessory gearbox.

In certain exemplary embodiments the fuel oxygen conversion unit further includes a catalyst in airflow communication with the stripping gas flowpath for removing an amount of oxygen from the flow of stripping gas through the stripping gas flowpath.

In another exemplary embodiment of the present disclosure, a gas turbine is provided. The gas turbine includes a combustion section and a fuel delivery system for providing a flow of fuel to the combustion section, the fuel delivery system including a fuel oxygen conversion unit defining a stripping gas flowpath. The fuel oxygen conversion unit includes a stripping gas boost pump positioned in airflow communication with the stripping gas flowpath for increasing a pressure of a flow of stripping gas through the stripping gas flowpath; a contactor defining a stripping gas inlet in airflow communication with the stripping gas flowpath, a liquid fuel inlet, and a fuel/gas mixture outlet; a fuel gas separator defining a fuel/gas mixture inlet in fluid communication with the fuel/gas mixture outlet of the contactor, a stripping gas outlet, and a liquid fuel outlet; and a connection assembly mechanically coupling the stripping gas boost pump to the fuel gas separator, the connection assembly having a speed change mechanism such that the stripping gas boost pump rotates at a different rotational speed than the fuel gas separator.

In another exemplary embodiment of the present disclosure, a gas turbine engine is provided. The gas turbine engine includes an accessory gearbox and a fuel oxygen conversion unit defining a stripping gas flowpath. The fuel oxygen conversion unit includes a stripping gas boost pump positioned in airflow communication with the stripping gas flowpath for increasing a pressure of a flow of stripping gas through the stripping gas flowpath; a contactor defining a stripping gas inlet in airflow communication with the stripping gas flowpath, a liquid fuel inlet, and a fuel/gas mixture outlet; and a fuel gas separator defining a fuel/gas mixture inlet in fluid communication with the fuel/gas mixture outlet of the contactor, a stripping gas outlet, and a liquid fuel outlet, the fuel gas separator and the stripping gas boost pump each mechanically coupled to and driven by the accessory gearbox.

In certain exemplary embodiments the accessory gearbox includes a first pad and a second pad, wherein the fuel gas separator is driven by the first pad, and wherein the stripping gas boost pump is driven by the second pad.

For example, in certain exemplary embodiments the accessory gearbox is configured such that the fuel gas separator is driven by the first pad at a rotational speed that is different than a rotational speed at which the stripping gas boost pump is driven by the second pad.

In certain exemplary embodiments the accessory gearbox includes a first pad, and wherein the fuel gas separator and the stripping gas boost pump are each driven by the first pad of the accessory gearbox.

In certain exemplary embodiments the fuel oxygen conversion unit further includes a connection assembly mechanically coupling the stripping gas boost pump to the fuel gas separator, and wherein the connection assembly includes a speed change mechanism such that the stripping gas boost pump rotates at a different rotational speed than the fuel gas separator.

For example, in certain exemplary embodiments the speed change mechanism is a gearbox.

For example, in certain other exemplary embodiments the gearbox defines a gear ratio, wherein the gear ratio is greater than 1:1 such that the stripping gas boost pump rotates more quickly than the fuel gas separator.

For example, in certain other exemplary embodiments the gearbox defines a gear ratio, wherein the gear ratio is less than 1:1 such that the fuel gas separator rotates more quickly than the stripping gas boost pump.

For example, in certain exemplary embodiments the speed change mechanism is a continuously variable transmission.

For example, in certain exemplary embodiments the speed change mechanism is a torque converter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
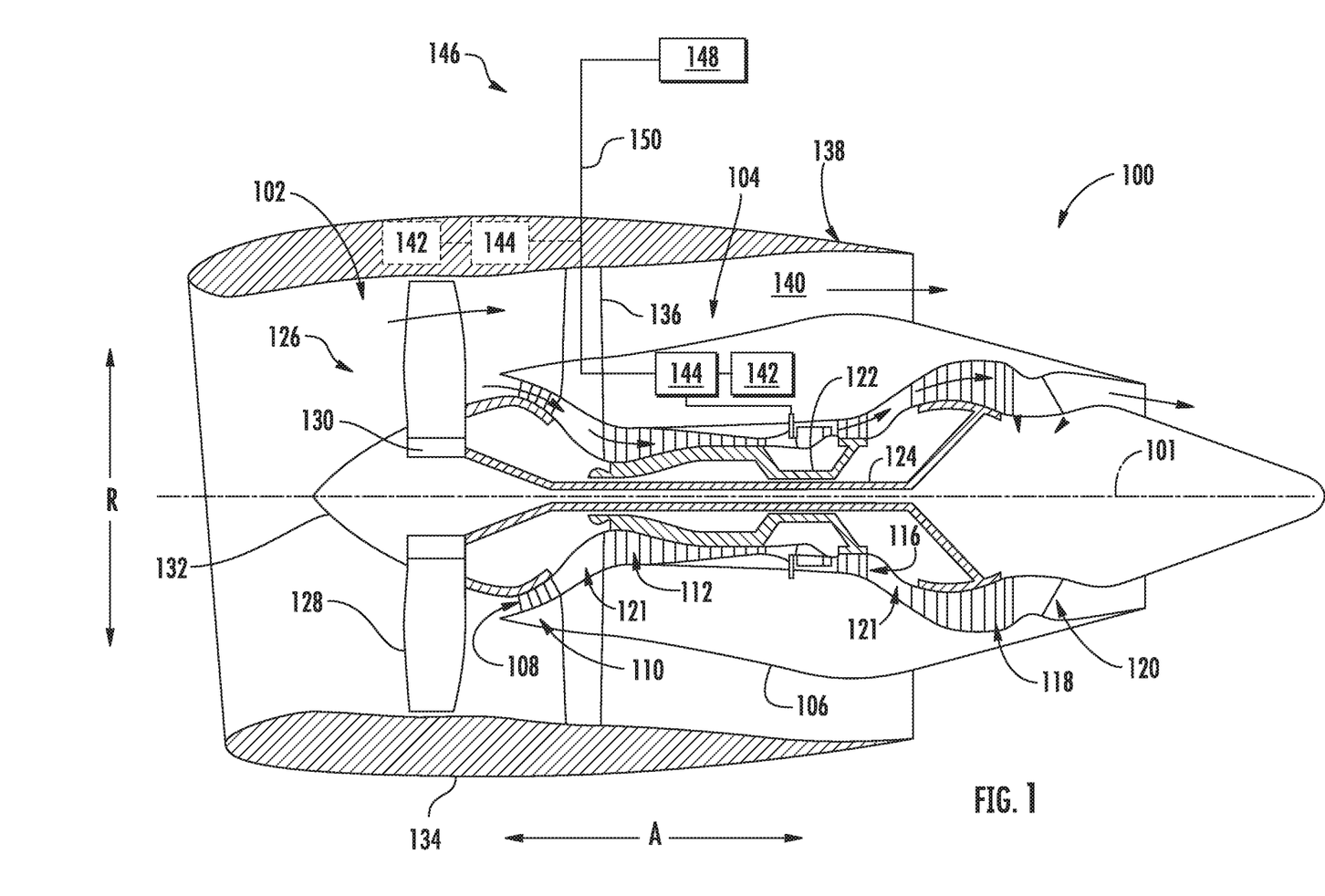
FIG. 1 is a schematic, cross-sectional view of a gas turbine engine in accordance with an exemplary embodiment of the present disclosure.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable vehicle.

For the embodiment depicted, the engine is configured as a high bypass turbofan engine 100. As shown in FIG. 1, the turbofan engine 100 defines an axial direction A (extending parallel to a longitudinal centerline 101 provided for reference), a radial direction R, and a circumferential direction (extending about the axial direction A; not depicted in FIG. 1). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 201 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 1, the turbofan engine 100 additionally includes an accessory gearbox 142, a fuel oxygen conversion unit 144, and a fuel delivery system 146. For the embodiment shown, the accessory gearbox 142 is located within the cowling/outer casing 106 of the turbomachine 104. Additionally, it will be appreciated that, although not depicted schematically in FIG. 1, the accessory gearbox 142 may be mechanically coupled to, and rotatable with, one or more shafts or spools of the turbomachine 104. For example, in at least certain exemplary embodiments, the accessory gearbox 142 may be mechanically coupled to, and rotatable with, the HP shaft 122. Further, for the embodiment shown, the fuel oxygen conversion unit 144 is coupled to, or otherwise rotatable with, the accessory gearbox 142. In such a manner, it will be appreciated that the exemplary fuel oxygen conversion unit 144 is driven by the accessory gearbox 142. Notably, as used herein, the term "fuel oxygen conversion" generally means a device capable of reducing a free oxygen content of the fuel.

Moreover, the fuel delivery system 146 generally includes a fuel source 148, such as a fuel tank, and one or more fuel lines 150. The one or more fuel lines 150 provide a fuel flow through the fuel delivery system 146 to the combustion section 114 of the turbomachine 104 of the turbofan engine 100.

It will be appreciated, however, that the exemplary turbofan engine 100 depicted in FIG. 1 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine 100, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, although not depicted herein, in other embodiments the gas turbine engine may be any other suitable type of gas turbine engine, such as an industrial gas turbine engine incorporated into a power generation system, a nautical gas turbine engine, etc. Further, still, in alternative embodiments, aspects of the present disclosure may be incorporated into, or otherwise utilized with, any other type of engine, such as reciprocating engines.

Moreover, it will be appreciated that although for the embodiment depicted, the turbofan engine 100 includes the accessory gearbox 142 and fuel oxygen conversion unit 144 positioned within the turbomachine 104, i.e., within the casing 106 of the turbomachine 104, in other embodiments, the accessory gearbox 142 and/or fuel oxygen conversion unit 144 may be positioned at any other suitable location. For example, as is depicted in phantom in FIG. 1, in other embodiments, the accessory gearbox 142 and/or the fuel oxygen conversion unit 144 may be positioned within the nacelle 134 of the turbofan engine 100. Alternatively, in still other embodiments, the accessory gearbox 142 may be positioned with the turbofan engine 100 and the fuel oxygen conversion unit 144 may be positioned remote from the turbofan engine 100, such as proximate to, or within, the fuel source 148 (e.g., fuel tank) of the fuel delivery system 146. Additionally, in other embodiments, the fuel oxygen conversion unit 144 may additionally or alternatively be driven by other suitable power sources such as an electric motor, a hydraulic motor, or an independent mechanical coupling to the HP or LP shaft, etc. For example, when the accessory gearbox 142 is driven by an electric motor, the electric motor may be configured to receive electrical power from an electric machine/generator being driven by the engine, such as an LP or HP system of the engine.

Figure 2:
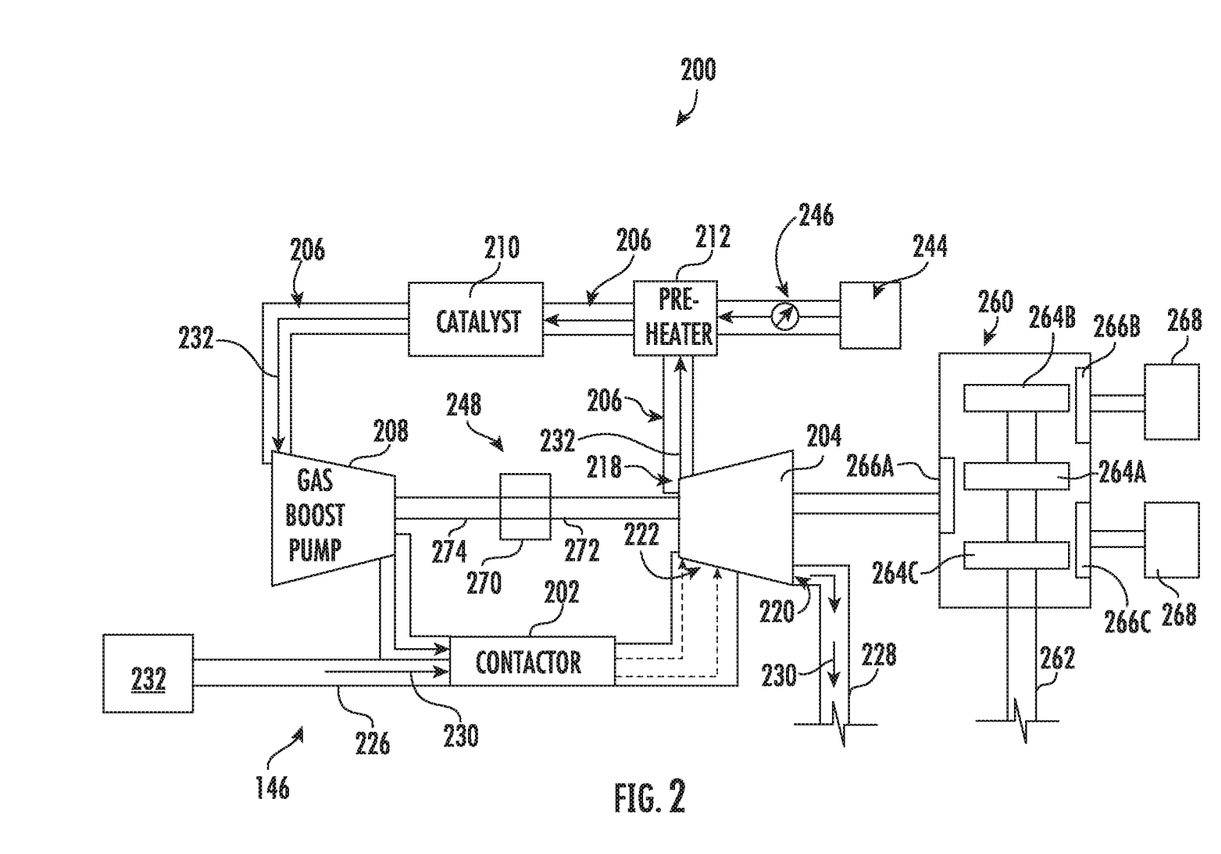
FIG. 2 is a schematic view of a fuel oxygen conversion unit in accordance with an exemplary embodiment of the present disclosure.

Referring now to FIG. 2, a schematic drawing of a fuel oxygen conversion unit 200 for a gas turbine engine in accordance with an exemplary aspect of the present disclosure is provided. In at least certain exemplary embodiments, the exemplary fuel oxygen conversion unit 200 depicted in FIG. 2 may be incorporated into, e.g., the exemplary engine 100 described above with reference to FIG. 1 (e.g., may be the fuel oxygen conversion unit 144 depicted in FIG. 1 and described above).

As will be appreciated from the discussion herein, the fuel oxygen conversion unit 200 of FIG. 2 generally includes a contactor 202 and a fuel gas separator 204. Additionally, the exemplary fuel oxygen conversion unit 200 defines a circulation gas flowpath 206 extending from the fuel gas separator 204 to the contactor 202. In certain exemplary embodiments, the circulation gas flowpath 206 may be formed of any combination of one or more conduits, tubes, pipes, etc., as well as structures or components within the circulation gas flowpath 206.

As will be explained in greater detail, below, the fuel oxygen conversion unit 200 generally provides for a flow of stripping gas 220 through the stripping gas flowpath 206 during operation. It will be appreciated that the term "stripping gas" is used herein as a term of convenience to refer to a gas generally capable of performing the functions described herein. The stripping gas 220 flowing through the stripping gas flowpath/circulation gas flowpath 206 may be an actual stripping gas functioning to strip oxygen from the fuel within the contactor, or alternatively may be a sparging gas bubbled through a liquid fuel to reduce an oxygen content of such fuel. For example, as will be discussed in greater detail below, the stripping gas 220 may be an inert gas, such as Nitrogen or Carbon Dioxide (CO2), an inert gas mixture, or some other gas or gas mixture having a relatively low oxygen content.

Moreover, for the exemplary fuel oxygen conversion unit 200 depicted in FIG. 2, the fuel oxygen conversion unit 200 further includes a gas boost pump 208, a catalyst 210, and a pre-heater 212. For the embodiment shown, the gas boost pump 208, the catalyst 210, and the pre-heater 212 are each arranged in series flow within the circulation gas flowpath 206. It will be appreciated, however, that in other embodiments, the oxygen conversion unit 200 may not define the circulation gas flowpath 206, and instead a stripping gas flow may come from an open loop source. Additionally, in other embodiments, the listed components may be provided in any suitable flow order.

As will be explained in more detail below, the exemplary fuel gas separator 204 generally defines a gas outlet 218, a liquid fuel outlet 220, and an inlet 222. It will also be appreciated that the exemplary fuel oxygen conversion unit 200 depicted is operable with a fuel delivery system 146, such as a fuel delivery system 146 of the gas turbine engine including the fuel oxygen conversion unit 200 (see, e.g., FIG. 1). The exemplary fuel delivery system 146 generally includes a plurality of fuel lines, and in particular, an inlet fuel line 226 and an outlet fuel line 228. The inlet fuel line 226 is fluidly connected to the contactor 202 for providing a flow of liquid fuel 230 to the contactor 202 (e.g., from a fuel source 148, such as a fuel tank). Additionally, the liquid fuel outlet 220 of the fuel gas separator 204 is fluidly connected to the outlet fuel line 228 of the fuel delivery system 146. In such a manner, the outlet fuel line 228 may receive a deoxygenated flow of liquid fuel 230, as will also be described in greater detail below.

During typical operations, a stripping gas 232 flows from the gas outlet 218 of the fuel gas separator 204, through the circulation gas flowpath 206 in a direction from the fuel gas separator 204 to the contactor 202. More specifically, during typical operations, stripping gas 232 flows from the gas outlet 218 of the fuel gas separator 204, through, for the embodiment depicted, a pre-heater 212 configured to add heat energy to the gas flowing therethrough, and to and through the catalyst 210. The stripping gas 232 then flows through the gas boost pump 208, wherein a pressure of the stripping gas 232 is increased to provide for the flow of the stripping gas 232 through the circulation gas flowpath 206. The relatively high pressure stripping gas 232 (i.e., relative to a pressure upstream of the boost pump 208 and the fuel entering the contactor 202) is then provided to the contactor 202, wherein the stripping gas 232 is mixed with a flow of liquid fuel 230 from the inlet fluid line 226 to generate a fuel gas mixture 228. The fuel gas mixture 228 generated within the contactor 202 is provided to the inlet 222 of the fuel gas separator 204.

Generally, it will be appreciated that during operation of the fuel oxygen conversion unit 200, the liquid fuel 230 provided through the inlet fuel line 226 to the contactor 202 may have a relatively high oxygen content. The stripping gas 232 provided to the contactor 202 may have a relatively low oxygen content or other specific chemical structure. As noted above, within the contactor 202, the liquid fuel 230 is mixed with the stripping gas 232, resulting in the fuel gas mixture 228. As a result of such mixing a physical exchange may occur whereby at least a portion of the oxygen within the fuel 230 is transferred to the stripping gas 232, such that the fuel component of the mixture 228 has a relatively low oxygen content (as compared to the fuel 230 provided through inlet fuel line 226) and the stripping gas component of the mixture 228 has a relatively high oxygen content (as compared to the stripping gas 232 provided through the circulation gas flowpath 206 to the contactor 202).

Figure 3:
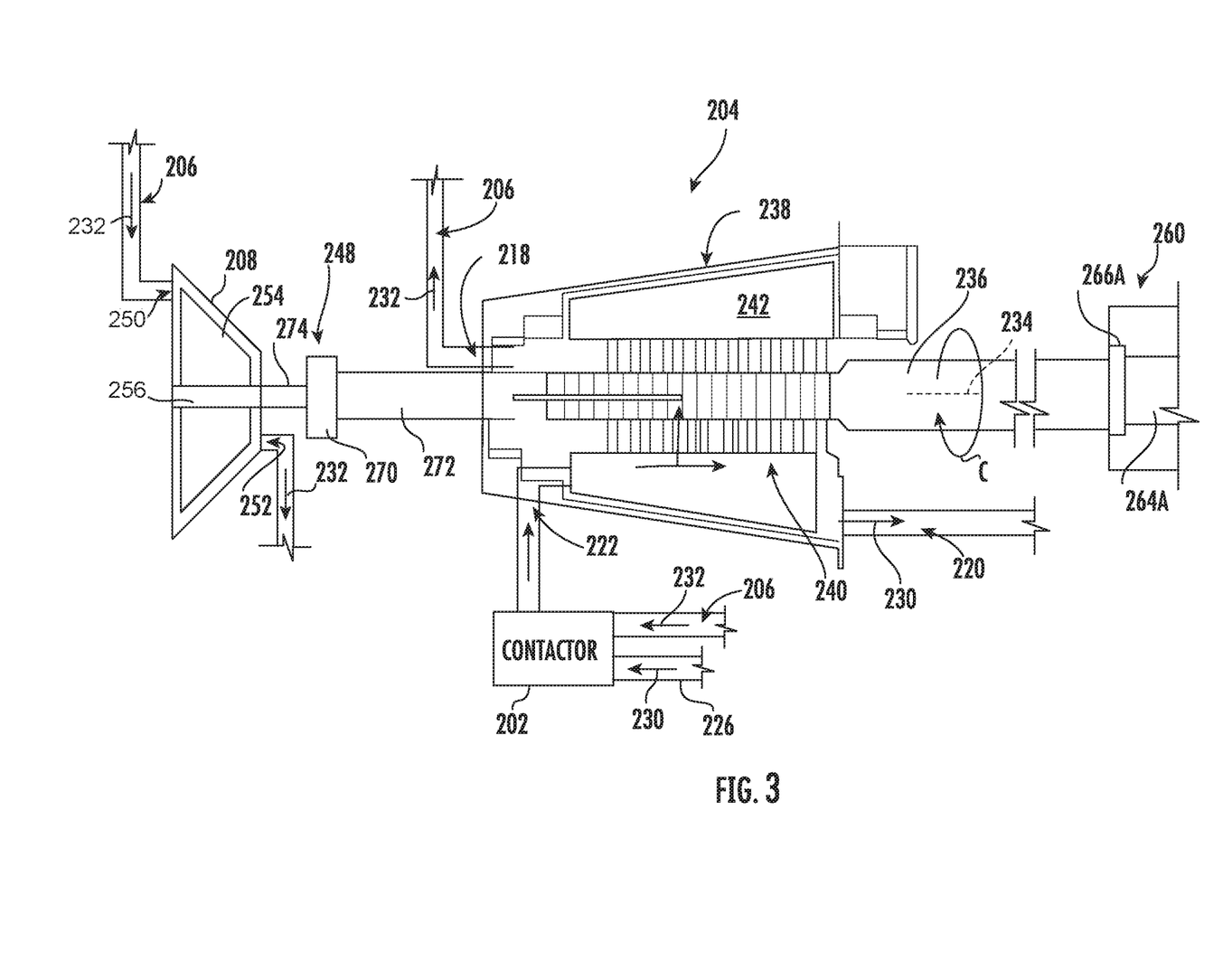
FIG. 3 is a close-up, schematic, cross-sectional view of a portion of the exemplary fuel oxygen conversion unit of FIG. 2.

Referring now also briefly to FIG. 3, providing a close-up, schematic, cross-sectional view of the exemplary fuel gas separator 204 and gas boost pump 208 of FIG. 2, it will be appreciated that within the fuel gas separator 204 the relatively high oxygen content stripping gas 232 is generally separated from the relatively low oxygen content fuel 230. Specifically, for the embodiment shown, the fuel gas separator 204 defines a central axis 234 and a circumferential direction C extending about the central axis 234. Additionally, the fuel gas separator 204 is configured as a mechanically-driven fuel gas separator, or more specifically as a rotary/centrifugal fuel gas separator. Accordingly, the fuel gas separator 204 includes an input shaft 236 and a separation assembly 238, the input shaft 236 mechanically coupled to the separation assembly 238, and the two components together rotatable about the central axis 234. Further, the input shaft 236 is mechanically coupled to, and driven by, e.g., a suitable power source, as is explained in greater detail, below.

Additionally, the exemplary separation assembly 238 depicted generally includes a core 240 arranged along the central axis 234, and a plurality of paddles 242 positioned radially outward of the core 240. During operation, a rotation of the separation assembly 238 about the central axis 234, and more specifically, a rotation of the plurality of paddles 242 about the central axis 234 (i.e., in the circumferential direction C), may generally force heavier liquid fuel 230 outward and lighter stripping gas 232 inward through the core 240. In such a manner, the liquid fuel 230 may exit through the liquid fuel outlet 220 of the fuel gas separator 204 and the stripping gas 232 may exit through the stripping gas outlet 218 of the fuel gas separator 204, as is indicated. Notably, the core 240 may include structures for deterring a liquid flow therethrough, such as a fluid deterrent mesh or geometry, or other fluid deterrent features.

Accordingly, it will be appreciated that the liquid fuel 230 provided to the liquid fuel outlet 220, having interacted with the stripping gas 220, may have a relatively low oxygen content, such that a relatively high amount of heat may be added thereto with a reduced risk of the fuel coking (i.e., chemically reacting to form solid particles which may clog up or otherwise damage components within the fuel flow path). For example, in at least certain exemplary aspects, the fuel 230 provided to the liquid fuel outlet 220 may an oxygen content of less than about five (5) parts per million ("ppm"), such as less than about three (3) ppm, such as less than about two (2) ppm, such as less than about one (1) ppm, such as less than about 0.5 ppm.

As is also depicted in FIG. 3, for the embodiment shown, the gas boost pump 208 is mechanically coupled to, and rotatable with, the fuel gas separator 204 through a connection assembly 248. In such a manner, it will be appreciated that the gas boost pump 208 is driven by the same power source driving the fuel gas separator 204, and further that the gas boost pump 208 is rotatable with the fuel gas separator 204.

More specifically, for the embodiment shown, the gas boost pump 208 defines a gas inlet 250 and a gas outlet 252, and includes a plurality of paddles 254 coupled to a shaft 256. The shaft 256 is connected to, and driven by, the connection assembly 248, such that when the fuel gas separator 204 is rotated, the shaft 256 and plurality of paddles 254 of the gas boost pump 208 are also rotated to increase a pressure and/or flowrate of the stripping gas 232 received through the gas inlet 250, and further to provide the stripping gas 232 at the higher pressure and/or flowrate to the stripping gas outlet 252. It will be appreciated, however, that the exemplary gas boost pump 208 depicted in FIG. 3 is provided by way of example only, in that in other exemplary embodiments, any other suitable mechanical gas boost pump may be provided.

Referring now back to the schematic view of the fuel oxygen conversion unit 200 in FIG. 2, it will further be appreciated that the exemplary fuel oxygen conversion unit 200 recirculates and reuses the stripping gas 232 (i.e., the stripping gas 232 flows in a substantially closed loop). However, the stripping gas 232 exiting the fuel gas separator 204, having interacted with the liquid fuel 226, may have a relatively high oxygen content. Accordingly, in order to reuse the stripping gas 232, an oxygen content of the stripping gas 232 from the gas outlet 218 of the fuel gas separator 204 needs to be reduced. For the embodiment depicted, and as noted above, the stripping gas 232 flows through the pre-heater 212 to the catalyst 210 where the oxygen content of the stripping gas 232 is reduced, and subsequently to the gas boost pump 208 (it being appreciated that in other exemplary aspects, such components may be arranged in any other suitable order). More specifically, within the catalyst 210, the relatively oxygen-rich stripping gas 232 is reacted to reduce the oxygen content thereof. It will be appreciated that catalyst 210 may be configured in any suitable manner to perform such functions (i.e., removal of oxygen from the recirculating stripping gas 232). For example, in certain embodiments, the catalyst 210 may be configured to enable the reaction of oxygen and fuel vapor present in the oxygen-rich stripping gas 220 to reduce the overall level of free oxygen in the stripping gas 220. However, in other embodiments, the catalyst 210 may additionally, or alternatively, include geometries of catalytic components through which the relatively oxygen-rich stripping gas 232 flows to reduce an oxygen content thereof. In one or more of these embodiments, the catalyst 210 may be configured to reduce an oxygen content of the stripping gas 232 to less than about three percent (3%) oxygen (O2) by mass, such less than about one percent (1%) oxygen (O2) by mass.

The resulting relatively low oxygen content stripping gas 232 is then provided through the remainder of the circulation gas flowpath 206 and back to the contactor 202, such that the cycle may be repeated. In such a manner, it will be appreciated that the stripping gas 232 may be any suitable gas capable of undergoing the transitions described above. For example, the stripping gas 232 may be deoxygenated air from, e.g., a core air flowpath of a gas turbine engine including the fuel oxygen conversion unit 200 (e.g., compressed air bled from an HP compressor 112; see FIG. 1). However, in other embodiments, the stripping gas 232 may instead be any other suitable gas, such as an inert gas, such as Nitrogen or Carbon Dioxide (CO2), an inert gas mixture, or some other gas or gas mixture having a relatively low oxygen content.

Briefly, it will also be appreciated that the exemplary fuel oxygen conversion unit 200 depicted includes a makeup gas source 244 fluidly connected to the circulation gas flowpath 206. The makeup gas source 244 may be any suitable gas source. For example, in certain embodiments, the makeup gas source 244 may be a compressor section of a gas turbine engine including the fuel oxygen conversion unit 200, such as high pressure compressor 112 of such compressor section (see FIG. 1). Additionally, or alternatively, the makeup gas source 244 may be a gas tank located within the gas turbine engine, or alternatively, located remotely from the gas turbine engine, such as within the aircraft. For the embodiment depicted, the makeup gas source 244 is in airflow communication with the circulation gas flowpath 206 through a variable flow valve 246, which may be actuatable to supply additional gas to the circulation gas flowpath 206 as needed. Although not depicted, the fuel oxygen conversion unit 200 may include one or more sensors for determining an airflow volume/flowrate through the circulation gas flowpath 206 to determine an amount of, if any, makeup gas that is needed. Notably, however, as mentioned above, in other embodiments the fuel oxygen conversion unit 200 may include an open loop stripping gas 232 path, such that the stripping gas 232 is not reused by the turbofan engine 100 and instead is, e.g., provided to atmosphere. In such an embodiment, the makeup gas source 244 may be the stripping gas 232 source.

Referring to FIGS. 2 and 3, generally, as noted above, the fuel gas separator 204 and gas boost pump 208 are coupled through the connection assembly 248 of the fuel oxygen conversion unit 200, allowing for the gas boost pump 208 and fuel gas separator 204 to each be driven by the same power source. For the embodiment shown, the power source driving the fuel gas separator 204 and the gas boost pump 208 (across the fuel gas separator 204 and connection assembly 248) is an accessory gearbox 260 of the engine with which the fuel oxygen conversion unit 200 is operable. The accessory gearbox 260 driving the fuel gas separator 204 and gas boost pump 208 may be configured in a similar manner to the exemplary accessory gearbox 142 described above with reference to FIG. 1. As will be appreciated, the accessory gearbox 260 may generally receive rotational power through an input shaft 262 mechanically driven by one or more shafts or spools of the engine, such as a low pressure shaft (e.g., LP shaft 124) or a high pressure shaft (e.g., HP shaft 122), or in other embodiments, mechanically driven by an electric motor (e.g., with the electric motor receiving electrical power from a generator driven by the engine, an aircraft system, etc.). Further, as is depicted schematically in FIG. 2, the exemplary accessory gearbox 260 includes a plurality of mechanically linked gears 264 driven by the input shaft 262, as well as a respective plurality of pads 266. Each of the plurality of pads 266 is configured to interface between one of the plurality of gears 264 and an accessory system 268 extracting power from, or adding power to, the accessory gearbox 260. In particular, for the embodiment shown, the exemplary accessory gearbox 260 is mechanically coupled to three accessory systems 268, one of which being the fuel oxygen conversion unit 200. Specifically, for example, the exemplary accessory gearbox 260 includes a first pad 266A mechanically linked to a first gear 264A, a second pad 266B mechanically linked to a second gear 264B, and a third pad 266C mechanically linked to a third gear 264C. For the embodiment depicted, the fuel gas separator 204 is coupled to the first pad 266A through the input shaft 236 of the fuel gas separator 204. The other accessory systems 268 are coupled to the second pad 266B and third pad 266C. Notably, however, in other embodiments, the accessory gearbox 260 may have any other suitable number and/or configuration of gears 264, pads 266, etc.

Referring still to FIGS. 2 and 3, rotational power received by the fuel gas separator 204 from the accessory gearbox 260 (i.e., through the first pad 266A of the accessory gearbox 260) is transferred through the connection assembly 248 to the gas boost pump 208. For the exemplary embodiment depicted, the connection assembly 248 includes a speed change mechanism 270 such that the gas boost pump 208 rotates at a different rotational speed than the fuel gas separator 204. More specifically, the connection assembly 248 includes a first member 272 coupled to the fuel gas separator 204 and rotatable at the same rotational speed as the fuel gas separator 204, a second member 274 coupled to the gas boost pump 208 and rotatable at the same rotational speed of the gas boost pump 208 and the speed change mechanism 270. Such may therefore allow for the fuel gas separator 204 to the designed to operate at a maximum efficient rotational speed, and further for the gas boost pump 208 to be designed to operate a maximum efficient rotational speed (which may not be the same as the maximum efficient rotational speed of the fuel gas separator 204).

Figure 4:
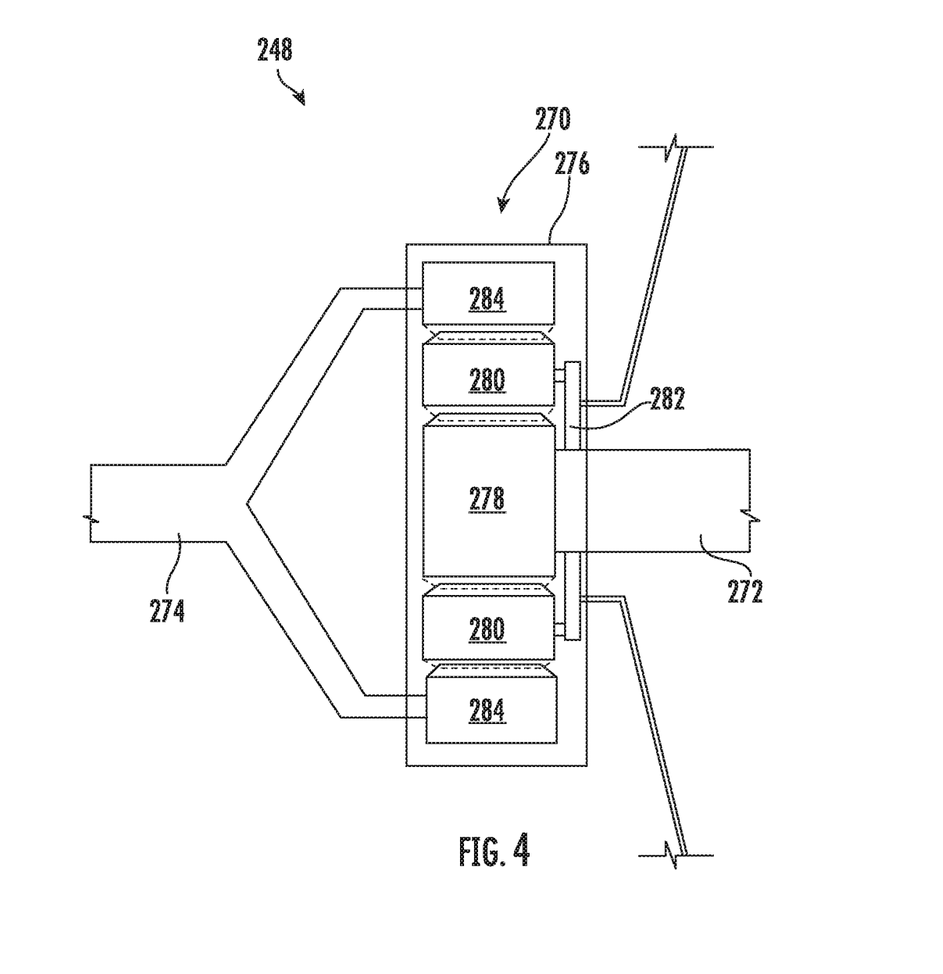
FIG. 4 is a schematic, cross-sectional view of a gearbox of a connection assembly of a fuel oxygen conversion unit in accordance with an exemplary embodiment of the present disclosure.

Referring still to FIG. 2, and now also to FIG. 4, it will be appreciated that in at least certain exemplary embodiments, the speed change mechanism 270 may be a gearbox. FIG. 2 provides a schematic view of a gearbox in accordance with an exemplary embodiment of the present disclosure as may be incorporated into the connection assembly 248 of FIG. 2. More specifically, the exemplary gearbox depicted as a planetary gearbox 276.

As is shown in FIG. 4, the planetary gearbox 276 generally includes a sun gear 278 coupled to the first member 272 of the connection assembly 248, a plurality of planet gears 280 coupled to a planet gear carrier 282 (with the planet gear carrier 282 coupled to a stationary component for the embodiment depicted), and a ring gear 284 coupled to the second member 274 of the connection assembly 248. As noted, the first member 272 is coupled to and rotatable with the fuel gas separator 204 (at the same rotational speed as the fuel gas separator 204) and the second member 274 is coupled to and rotatable with the gas boost pump 208 (at the same rotational speed as the gas boost pump 208). In such a manner, a rotational speed of the gas boost pump 208 may be modified relative to a rotational speed of the fuel gas separator 204. More specifically, it will be appreciated that for the embodiment shown, the gearbox 276 defines a gear ratio (i.e., ratio of a rotational speed of the output/second member 274 of the connection assembly 248 to a rotational speed of the input/first member 272 of the connection assembly 248). For the embodiment shown, the gear ratio is greater than 1:1 such that the stripping gas boost pump 208 rotates more quickly than the fuel gas separator 204. In certain exemplary embodiments, for example, gear ratio may be at least about 1.1:1, at least about 1.25:1, at least about 1.5:1, or up to about 20:1.

Figure 5:
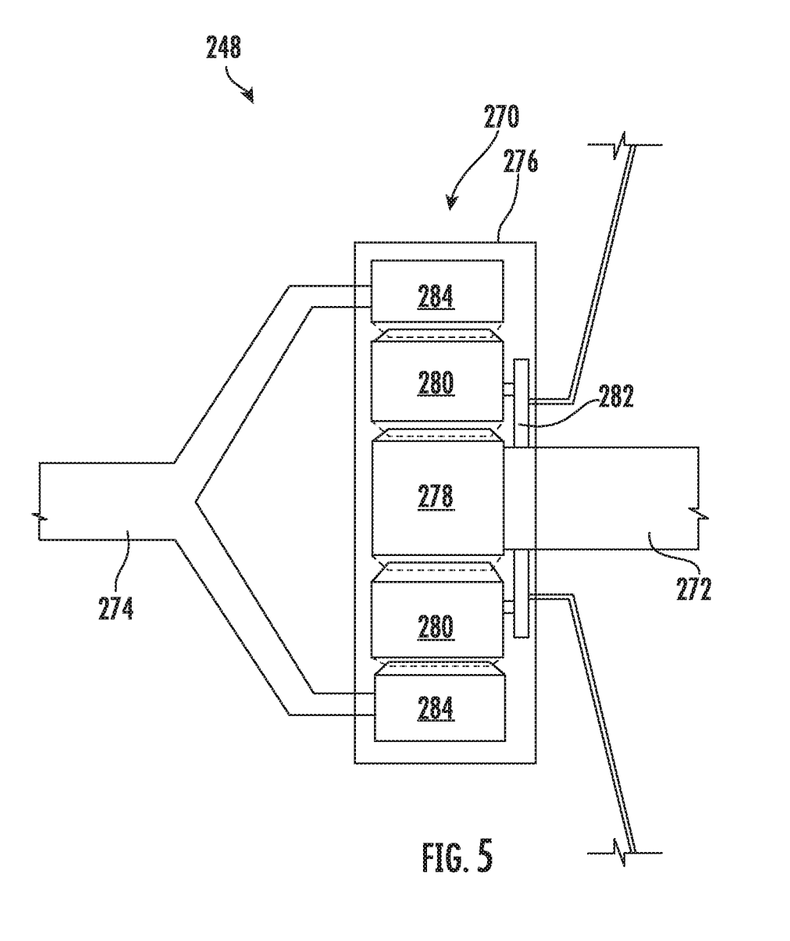
FIG. 5 is a schematic, cross-sectional view of a gearbox of a connection assembly of a fuel oxygen conversion unit in accordance with another exemplary embodiment of the present disclosure.

It will be appreciated, however, that in other exemplary embodiments, the planetary gearbox 276 may have any other suitable configuration. For example, in other embodiments the planetary gearbox 276 may define any other suitable gear ratio. For example, referring now briefly to FIG. 5, providing a planetary gearbox 276 in accordance with another exemplary embodiment of the present disclosure, the gearbox 276 may define a gear ratio less than about 1:1. With such a configuration, the fuel gas separator 204 may rotate more quickly than the gas boost pump 208. For example, the gear ratio of the exemplary gearbox 276 of FIG. 5 may be less than about 1:1.1, less than about 1:1.25, less than about 1:1.5, less than about 1:2, such as at least about 1:20.

It will further be appreciated, however, that in still other embodiments other suitable speed change mechanisms 270 may be utilized. For example, in other exemplary embodiments, the speed change mechanism 270 may be a variable-gear ratio gearbox, a transmission, or a fluid coupling.

Figure 6:
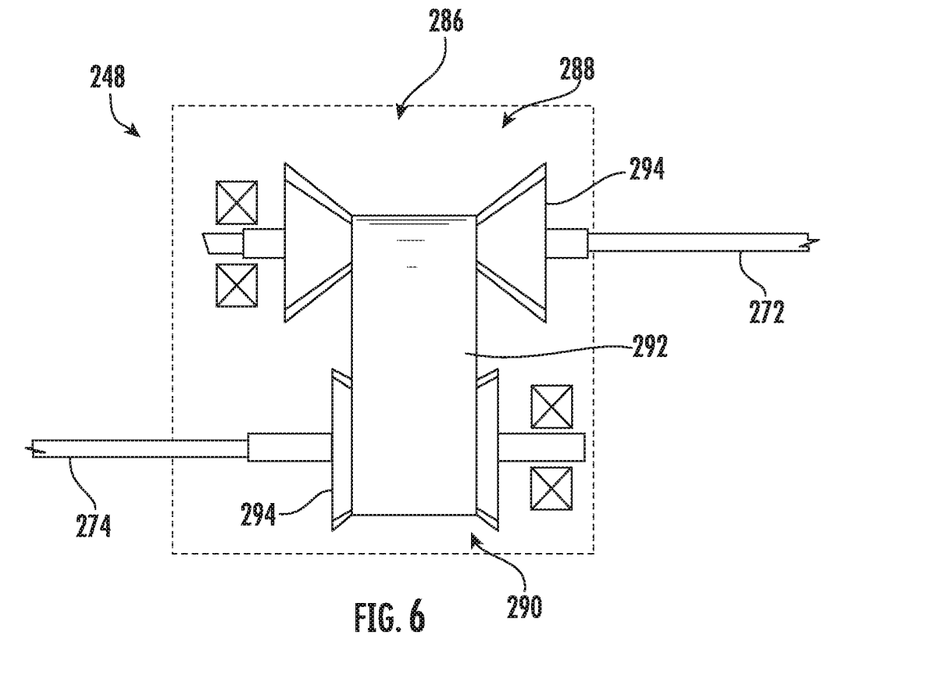
FIG. 6 is a schematic, cross-sectional view of a transmission of a connection assembly of a fuel oxygen conversion unit in accordance with an exemplary embodiment of the present disclosure.

For example, referring briefly to FIG. 6, a schematic view is provided of a continuously variable transmission 286 as may be incorporated into the connection assembly 248 of the exemplary fuel oxygen conversion unit 200 of FIGS. 2 and 3 as the speed change mechanism 270 depicted. As is depicted, the exemplary continuously variable transmission 286 generally includes a first gear 288 and a second gear 290 coupled through a belt 292. The first gear 288 may be coupled to the first member 272 of the connection assembly 248 and the second gear 290 may be coupled to the second member 274 of the connection assembly 248. Each of the first gear 288 and second gear 290 generally include opposing conical shaped members 294 movable closer to one another (see, e.g., the second gear 290), and further movable away from another (see, e.g., the first gear 288). By moving the opposing conical shaped members 294 of the second gear 290 and first gear 288 closer to one another or further away from another, the continuously variable transmission 286 may provide a large variety of gear ratios to rotatably connect the gas boost pump 208 to the fuel gas separator 204.

It will be appreciated, however, that in other exemplary embodiments, any other suitable continuously variable transmission 286 (or variable-gear ratio gearbox) may be provided. For example, in other embodiments, the continuously variable transmission may be a variable diameter pulley type transmission, a roller based transmission, a magnetic transmission, an infinitely variable transmission, a cone transmission, etc.

Figure 7:
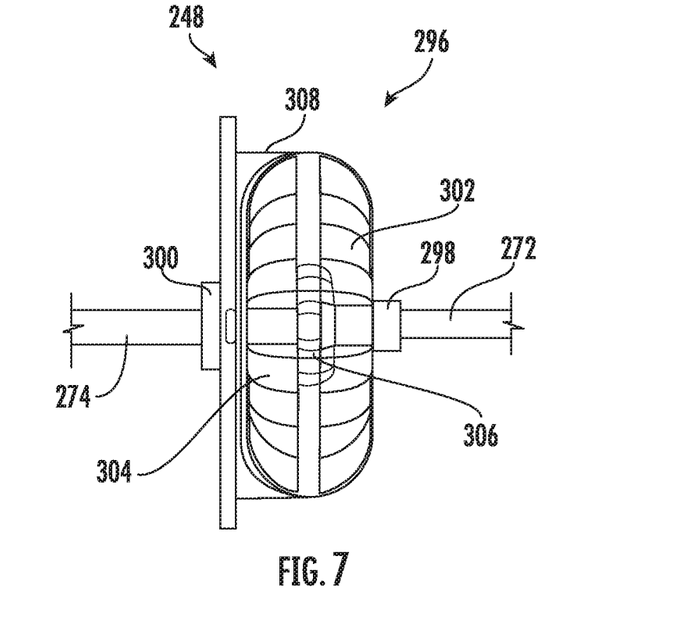
FIG. 7 is a schematic, cross-sectional view of a fluid connector of a connection assembly of a fuel oxygen conversion unit in accordance with an exemplary embodiment of the present disclosure.

Further, for example, referring now to FIG. 7, a schematic view is provided of a fluid coupling in accordance with an exemplary embodiment of the present disclosure as may be incorporated into the connection assembly 248 of the exemplary fuel oxygen conversion unit 200 of FIGS. 2 and 3 as the speed change mechanism 270 depicted. More specifically, for the embodiment shown, the fluid coupling is a torque converter 296. An input 298 of the torque converter 296 is coupled to a first member 272 of the connection assembly 248 and an output 300 of the torque converter 296 is coupled to a second member 274 of the connection assembly 248. The torque converter 296 further includes an impeller 302 coupled to the input 298, a turbine 304 coupled to the output 300, and a stator 306. The impeller 302, the turbine 304, and the stator 306 are enclosed within a housing 308 further including a transmission fluid therein. Rotation of the input 298 drives the impeller 302, which moves transmission fluid across the stator 306 and through the turbine 304, driving the turbine 304, and in turn driving the output 300. The impeller 302 and turbine 304 may be designed (e.g., blade size, angle, density, etc.) to achieve a desired speed change/speed ratio across the connection assembly, similar to the gearboxes described above with reference to FIGS. 4 and 5.

Figure 8:
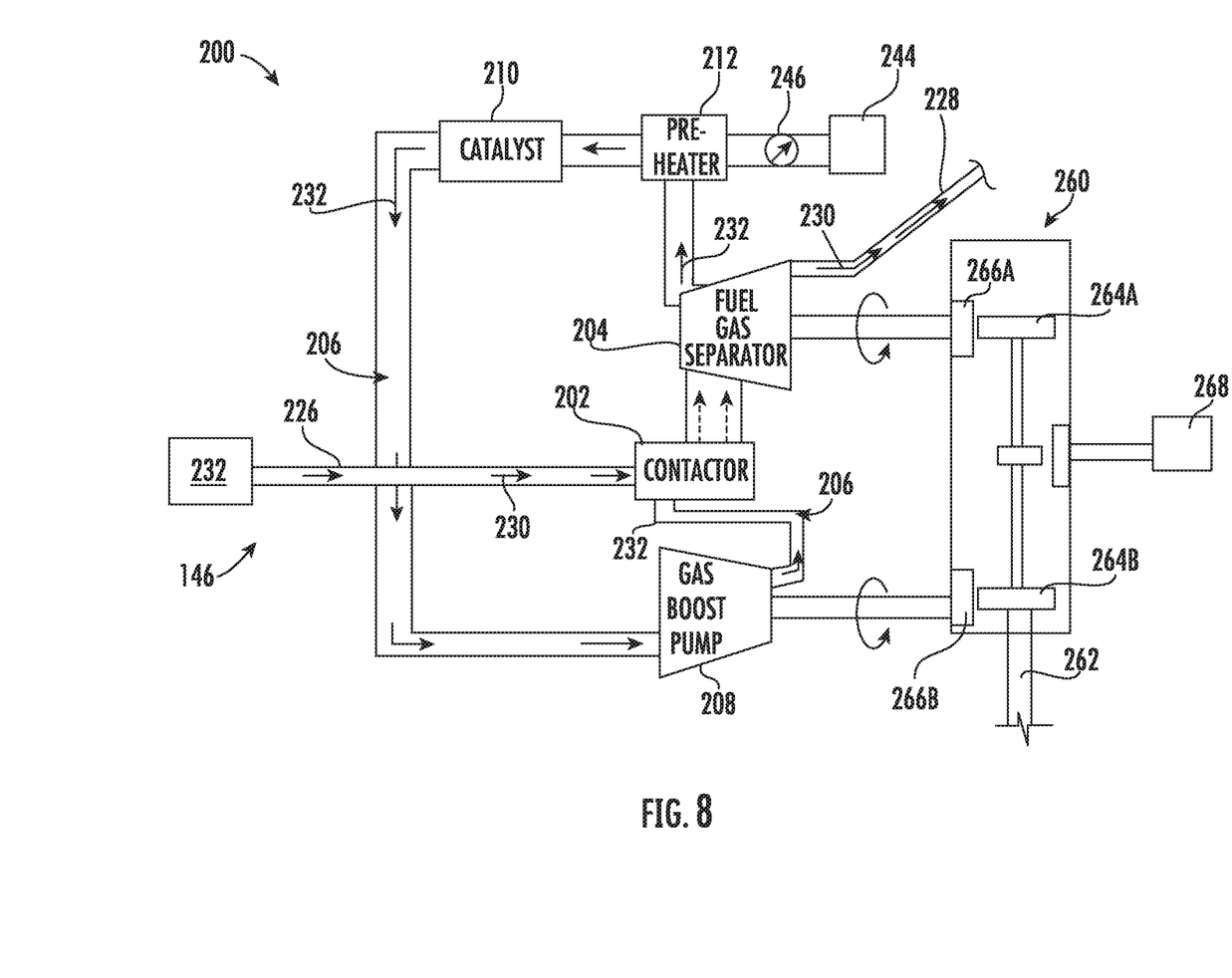
FIG. 8 is a schematic view of a fuel oxygen conversion unit in accordance with another exemplary embodiment of the present disclosure.

Further, it will be appreciated that the exemplary fuel oxygen conversion unit 200 (and the various exemplary speed change mechanisms 270 of the exemplary connection assembly 248) described above with reference to FIGS. 2 through 7 are provided by way of example. In other embodiments, the exemplary fuel oxygen conversion unit 200 may have any other suitable configuration. For example, referring now to FIG. 8, a fuel oxygen conversion unit 200 in accordance with another exemplary embodiment of the present disclosure is provided. The exemplary fuel oxygen conversion unit 200 of FIG. 8 may be configured in substantially the same manner as the exemplary fuel oxygen conversion unit 200 of FIG. 2. For example, the exemplary fuel oxygen conversion unit 200 of FIG. 8 includes a gas boost pump 208 and a fuel gas separator 204. For the embodiment shown, the fuel gas separator 204 and the gas boost pump 208 are each driven by an accessory gearbox 260 of the gas turbine engine, similar to the exemplary embodiment of FIG. 2. However, for the embodiment of FIG. 8, the gas boost pump 208 and the fuel gas separator 204 are each independently driven by the accessory gearbox 260. Specifically, the exemplary accessory gearbox 260 includes a first pad 266A and a second pad 266B, interfacing with a first gear 264A and a second gear 264B, respectively. The fuel gas separator 204 is driven by the first pad 266A and the stripping gas 232 boost pump 208 is driven by the second pad 266B. In such a manner, the gas boost pump 208 and fuel gas separator 204 are each driven by the same power source, and further are mechanically coupled (i.e., through the various gears 264 and shafts of the accessory gearbox 260). However, with the embodiment of FIG. 8, the gas boost pump 208 may be rotated at a different rotational speed than the fuel gas separator 204 by virtue of independent connection of the gas boost pump 208 to the accessory gearbox 260 (e.g., by the potentially different configurations of the first and second gears 264A, 264B, such as different sizes of the first and second gears 264A, 264B).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fuel oxygen conversion unit defining a stripping gas flowpath for a vehicle, or an engine of the vehicle, the fuel oxygen conversion unit comprising:
    a stripping gas boost pump positioned in airflow communication with the stripping gas flowpath for increasing a pressure of a flow of stripping gas through the stripping gas flowpath;
    a contactor defining a stripping gas inlet in airflow communication with the stripping gas flowpath, a liquid fuel inlet, and a fuel/gas mixture outlet;
    a fuel gas separator defining a fuel/gas mixture inlet in fluid communication with the fuel/gas mixture outlet of the contactor, a stripping gas outlet, and a liquid fuel outlet; and
    a connection assembly mechanically coupling the stripping gas boost pump to the fuel gas separator, the connection assembly having a speed change mechanism configured such that the stripping gas boost pump rotates at different faster rotational speed than the fuel gas separator.

2. The fuel oxygen conversion unit of claim 1, wherein the speed change mechanism is a gearbox.

3. The fuel oxygen conversion unit of claim 2, wherein the gearbox defines a gear ratio, wherein the gear ratio is greater than 1:1.

4. The fuel oxygen conversion unit of claim 1, wherein the speed change mechanism is a continuously variable transmission.

5. The fuel oxygen conversion unit of claim 1, wherein the speed change mechanism is a torque converter.

6. The fuel oxygen conversion unit of claim 1, wherein the engine comprises an accessory gearbox, and wherein the fuel gas separator and stripping gas boost pump are each driven by the accessory gearbox.

7. The fuel oxygen conversion unit of claim 6, wherein the accessory gearbox includes a first pad, and wherein the fuel gas separator and the stripping gas boost pump are each driven by the first pad of the accessory gearbox.

8. The fuel oxygen conversion unit of claim 1, further comprising:
    a catalyst in airflow communication with the stripping gas flowpath for removing an amount of oxygen from the flow of stripping gas through the stripping gas flowpath.

9. A gas turbine engine comprising:
    a combustion section; and
    a fuel delivery system for providing a flow of fuel to the combustion section, the fuel delivery system comprising a fuel oxygen conversion unit defining a stripping gas flowpath, the fuel oxygen conversion unit comprising
    a stripping gas boost pump positioned in airflow communication with the stripping gas flowpath for increasing a pressure of a flow of stripping gas through the stripping gas flowpath;
    a contactor defining a stripping gas inlet in airflow communication with the stripping gas flowpath, a liquid fuel inlet, and a fuel/gas mixture outlet;
    a fuel gas separator defining a fuel/gas mixture inlet in fluid communication with the fuel/gas mixture outlet of the contactor, a stripping gas outlet, and a liquid fuel outlet; and
    a connection assembly mechanically coupling the stripping gas boost pump to the fuel gas separator, the connection assembly having a speed change mechanism configured such that the stripping gas boost pump rotates at a faster rotational speed than the fuel gas separator.

10. A gas turbine engine comprising:
    an accessory gearbox; and
    a fuel oxygen conversion unit defining a stripping gas flowpath and comprising
    a stripping gas boost pump positioned in airflow communication with the stripping gas flowpath for increasing a pressure of a flow of stripping gas through the stripping gas flowpath;

a contactor defining a stripping gas inlet in airflow communication with the stripping gas flowpath, a liquid fuel inlet, and a fuel/gas mixture outlet; and a fuel gas separator defining a fuel/gas mixture inlet in fluid communication with the fuel/gas mixture outlet of the contactor, a stripping gas outlet, and a liquid fuel outlet, the fuel gas separator and the stripping gas boost pump each mechanically coupled to and driven by the accessory gearbox;

wherein the fuel oxygen conversion unit further comprises a connection assembly mechanically coupling the stripping gas boost pump to the fuel gas separator, and wherein the connection assembly includes a speed change mechanism configured such that the stripping gas boost pump rotates at a faster rotational speed than the fuel gas separator.

11. The gas turbine engine of claim 10, wherein the accessory gearbox includes a first pad and a second pad, wherein the fuel gas separator is driven by the first pad, and wherein the stripping gas boost pump is driven by the second pad.

12. The gas turbine engine of claim 10, wherein the accessory gearbox includes a first pad, and wherein the fuel gas separator and the stripping gas boost pump are each driven by the first pad of the accessory gearbox.

13. The gas turbine engine of claim 10, wherein the speed change mechanism is a gearbox.

14. The gas turbine engine of claim 13, wherein the gearbox defines a gear ratio, wherein the gear ratio is greater than 1:1.

15. The gas turbine engine of claim 10, wherein the speed change mechanism is a continuously variable transmission.

16. The gas turbine engine of claim 10, wherein the speed change mechanism is a torque converter.

* * * * *